United States Patent
Nishimura

(10) Patent No.: US 6,874,952 B2
(45) Date of Patent: Apr. 5, 2005

(54) OPTICAL MODULE AND METHOD OF ASSEMBLING THE OPTICAL MODULE

(75) Inventor: Tetsuya Nishimura, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 10 days.

(21) Appl. No.: 10/033,846

(22) Filed: Dec. 27, 2001

(65) Prior Publication Data

US 2002/0085816 A1 Jul. 4, 2002

(30) Foreign Application Priority Data

Dec. 28, 2000 (JP) ........................................ 2000-400425

(51) Int. Cl.⁷ ................................................. G02B 6/43
(52) U.S. Cl. ............................. 385/89; 385/92; 385/52
(58) Field of Search ............................. 385/89, 92, 14, 385/31–33, 136, 52; 356/153

(56) References Cited

U.S. PATENT DOCUMENTS

| | | | | |
|---|---|---|---|---|
| 4,772,123 | A | * | 9/1988 | Radner ........................ 356/153 |
| 5,383,118 | A | * | 1/1995 | Nguyen ........................ 700/59 |
| 6,374,004 | B1 | * | 4/2002 | Han et al. ...................... 385/14 |
| 6,455,944 | B1 | * | 9/2002 | Kato et al. ................... 257/797 |
| 6,526,205 | B1 | * | 2/2003 | Wilson et al. ................. 385/52 |
| 6,741,778 | B1 | * | 5/2004 | Chan et al. ................... 385/52 |
| 6,759,687 | B1 | * | 7/2004 | Miller et al. ................... 257/98 |

FOREIGN PATENT DOCUMENTS

| | | | |
|---|---|---|---|
| DE | 19 507945 | 9/1996 | |
| EP | 0463390 | 1/1992 | |
| EP | 0 589622 | 3/1994 | |
| EP | 0 596613 | 5/1994 | |
| JP | 04 221912 | 8/1992 | |
| JP | 04221912 A | * 8/1992 | ............ G02B/6/42 |
| JP | 854535 | 2/1996 | |
| JP | 09 159882 | 6/1997 | |
| JP | 09159882 A | * 6/1997 | ............ G02B/6/42 |
| JP | 11 311721 | 11/1999 | |
| WO | 0 127676 | 4/2001 | |

* cited by examiner

*Primary Examiner*—John D. Lee
*Assistant Examiner*—Eric Wong
(74) *Attorney, Agent, or Firm*—David N. Lathrop, Esq.; Gallagher & Lathrop

(57) ABSTRACT

There are provided an optical module in which an assembling process of its optical coupling part can be simplified, and a method of assembling the optical module. After a surface light receiving type or a surface light emitting type optical element has been mounted on a substrate, in case of mounting an optical fiber array to the substrate with a spacer or spacers interposed between the substrate and the optical fiber array, the optical fiber array is mounted and fixed to the substrate with the spacer or spacers interposed therebetween while alignment between a plurality of light receiving elements or light emitting elements of the optical element and the end surfaces of a plurality of optical fibers of the optical fiber array is being carried out by image recognition thereof.

7 Claims, 4 Drawing Sheets

US 6,874,952 B2

OPTICAL MODULE AND METHOD OF ASSEMBLING THE OPTICAL MODULE

BACKGROUND OF THE INVENTION

1. Field of the Invention

The present invention relates to an optical module provided with a surface light emitting type optical element or surface light receiving type optical element, and a method of assembling the optical module.

2. Description of the Related Art

An optical module that is capable of transmitting a plurality of optical signals is provided with a surface light emitting type optical element (it is also called an optical device) such as, for example, an laser diode array, and transmits optical signals emitted from the surface light emitting type optical element to an external circuit, device, apparatus or the like through an optical transmission path or line such as, for example, an optical fiber array. Also, an optical module that is capable of receiving a plurality of optical signals is provided with a surface light receiving type optical element (it is also called an optical device) such as, for example, a photodiode array, and receives optical signals transmitted from an external circuit, device, apparatus or the like through an optical transmission path or line such as, for example, an optical fiber array by the surface light receiving type optical element. There is an optical module that is provided with both a surface light emitting type optical element and a surface light receiving type optical element and is capable of transmitting and receiving a plurality of optical signals.

The optical module capable of transmitting and/or receiving a plurality of optical signals has its optical coupling part that is constructed by a surface light receiving type or surface light emitting type optical element and an optical transmission path or line such as an optical fiber array, and it is required that the optical transmission path, for example, optical fibers of an optical fiber array are mounted on the surface light receiving type or surface light emitting type optical element mounted on a substrate such that the optical fibers are aligned with the optical element.

In a prior art, an optical fiber array has been mounted on a substrate by aligning the cores of the optical fibers of the optical fiber array with the surface light receiving type or surface light emitting type optical element without driving the surface light receiving type or surface light emitting type optical element (this is called "passive alignment"). In other words, the optical fiber array has been mounted on the substrate without conducting active alignment (alignment that is carried out by driving the optical element).

In order to mount the optical fiber array on the substrate without driving the surface light receiving type or surface light emitting type optical element, in a prior art, such a procedure or process has been adopted that some positioning markers are provided on the substrate, for example, and that the optical element and the optical fiber array are mounted on the substrate on the basis of the markers, that is, by use of the markers as their fiducial points, respectively.

However, in case of mounting the optical element and the optical fiber array on the substrate by use of the markers without conducting the active alignment, it is necessary that precise markers are provided on the substrate at high accuracy. Moreover, both the optical element and the optical fiber array must be mounted with respect to the markers at extremely high accuracy. For that reason, in the prior art, a large number of working steps are needed in assembling the optical coupling part of the optical module, which results in a considerable increase of the cost of the optical module.

SUMMARY OF THE INVENTION

It is an object of the present invention to provide an optical module in which an assembling process of its optical coupling part can be simplified.

It is another object of the present invention to provide a method of assembling an optical module in which an alignment between light receiving elements or light emitting elements of the optical module and optical fibers is carried out by image recognition thereof.

In order to accomplish the foregoing objects, in one aspect of the present invention, there is provided an optical module which comprises: a surface light receiving type or a surface light emitting type optical element mounted on a predetermined substrate; at least one spacer mounted on said substrate; and an optical fiber array having a plurality of optical fibers buried therein substantially in parallel with one another with a predetermined pitch therebetween, the optical fiber array being mounted to the substrate with the spacer interposed between the substrate and the optical fiber array such that the optical fibers are opposed to a plurality of light receiving elements or light emitting elements of the optical element mounted on the substrate respectively, and the optical fiber array being mounted to the substrate with alignment between the end surfaces of the optical fibers and the light receiving elements or light emitting elements carried out by image recognition thereof.

In another aspect of the present invention, there is provided a method of assembling an optical module which comprises the steps of: mounting a surface light receiving type or a surface light emitting type optical element on a predetermined substrate; carrying out alignment between a plurality of light receiving elements or light emitting elements of the optical element and the end surfaces of a plurality of optical fibers of an optical fiber array by image recognition thereof, the end surfaces of the optical fibers being opposed to the light receiving elements or light emitting elements; and mounting the optical fiber array to the substrate with at least one spacer interposed between the substrate and the optical fiber array in the state that the alignment between the light receiving elements or light emitting elements and the end surfaces of the optical fibers is being kept.

In a preferred embodiment, the aforesaid alignment by the image recognition is carried out on the basis of image information on the surface of the substrate on which the optical element and the spacer have been mounted as well as image information on the surface of the optical fiber array at the side thereof not opposed to the optical element.

In accordance with the present invention, the alignment between the light receiving elements or the light emitting elements of the optical element and the end surfaces of the optical fibers of the optical fiber array is carried out by image recognition thereof. Accordingly, it is unnecessary to provide precise markers on the substrate at high accuracy as in the prior art as well as to mount the optical element on the substrate with high precision. As a result, the number of working steps required in assembling the optical module can be remarkably decreased, and the assembling work of the optical coupling part of the optical module can be simplified. Moreover, it is possible to reduce the manufacturing cost of the optical module.

BRIEF DESCRIPTION OF THE DRAWINGS

FIG. 2 is diagrammatical views for explaining the manner that an alignment between light receiving elements of an optical device and optical fibers of an optical fiber array is carried out by image recognition thereof;

DETAILED DESCRIPTION OF THE PREFERRED EMBODIMENTS

The preferred embodiment of the present invention will now be described in detail with reference to FIGS. 1 to 4. The present invention may, however, be embodied in many different forms and should not be construed as limited to the embodiment set forth hereinafter; rather, the embodiment is provided so that this disclosure will be thorough and complete, and will fully convey the scope of the invention to those skilled in the art.

Figure 1:
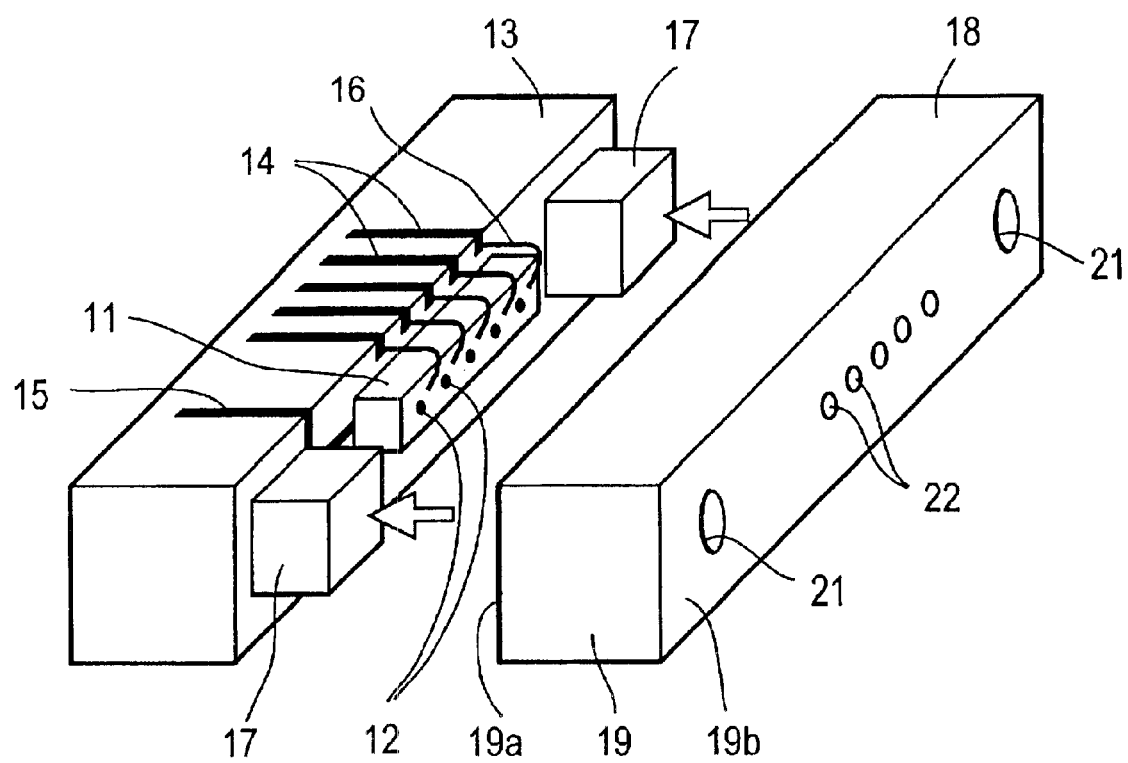
FIG. 1 is an exploded perspective view showing the construction of an embodiment of the optical module according to the present invention.

FIG. 1 is an exploded perspective view showing the construction of an embodiment of the optical module according to the present invention, FIG. 2 is diagrammatical views for explaining the manner that an alignment between light receiving elements of an optical device and optical fibers of an optical fiber array is carried out by image or picture recognition thereof, and FIG. 3 is diagrammatical views for explaining the mounting work of the optical fiber array. Further, this embodiment is a case that the present invention is applied to an optical module that is capable of receiving a plurality of optical signals. However, it is needless to say that the present invention is also applied to an optical module that is capable of transmitting a plurality of optical signals.

The optical module of this embodiment comprises: a substrate 13 of generally rectangular parallelepipedic shape; a surface light receiving type optical device 11 of generally rectangular parallelepipedic shape having five light receiving elements (for example, photodiodes) 12 therein aligned with a predetermined pitch or spacing therebetween along the longitudinal direction of the substrate 13, the surface light receiving type optical device 11 being mounted on one surface (right side vertical surface in FIG. 1, this surface being defined as the front surface of the substrate 13) of a pair of generally rectangular vertical surfaces of the substrate 13 opposed to each other; two spacers 17 of generally rectangular parallelepipedic shape mounted on the substrate 13 respectively at the opposed sides of the optical device 11 in the longitudinal direction thereof; and an optical fiber array 18 of generally rectangular parallelepipedic shape mounted to the substrate 13 with the spacers 17 interposed between the substrate 13 and the optical fiber array 18.

A predetermined wiring pattern is formed on the generally rectangular parallelepipedic substrate 13. In this embodiment, the wiring pattern is three dimensionally formed on the substrate 13 from the generally rectangular top surface thereof to the generally rectangular front surface thereof. For the purpose of simplifying the drawing, there are shown in FIG. 1 only five signal pattern conductors 14 formed in generally parallel with one another and to be connected to the corresponding light receiving elements 12 of the optical device 11, and one ground pattern conductor 15 to be connected to an electrode formed on the rear surface of the optical device 11. Further, in this embodiment, the surface light receiving type optical device 11 has the five light receiving elements 12 provided therein which are, for example, photodiodes arranged in a line with a predetermined pitch therebetween, but the number of the light receiving elements 12 of the optical device 11 is not limited to five, and there may be a case that the light receiving elements 12 are arranged in plural lines.

The aforesaid electrode formed on the rear surface of the surface light receiving optical device 11 of generally rectangular parallelepipedic shape is one common to the five light receiving elements 12, and the optical device 11 is mounted on the substrate 13 by die bonding of this electrode on the ground pattern conductor 15. On the front surface of the optical device 11 are formed electrodes not shown each of which has been connected to corresponding one of the light receiving elements 12, and these electrodes are connected to the corresponding signal pattern conductors 14, respectively, by wire bonding. In FIG. 1, the reference numeral 16 denotes bonding wires connecting between the signal pattern conductors 14 and the electrodes of the corresponding light receiving elements 12, respectively.

The generally rectangular parallelepipedic optical fiber array 18 comprises: a block 19 of generally rectangular parallelepiped shape; five optical fibers 22 buried in the block 19 in a line in such manner that they penetrate the block 19 from the front surface 19a thereof (the surface opposed to the optical device 11 is defined as the front surface) to the rear surface 19b thereof in parallel with one another; and two guide holes 21 of circular shape in section formed in the block 19 in such manner that they penetrate the block 19 from the front surface 19a thereof to the rear surface 19b thereof at areas near the opposed sides of the block 19.

Figure 2A:
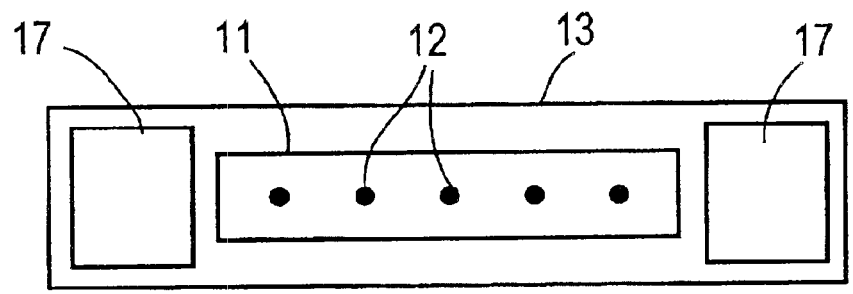
FIG. 2A is a diagrammatical front view of the substrate shown in FIG. 1.
Figure 2B:
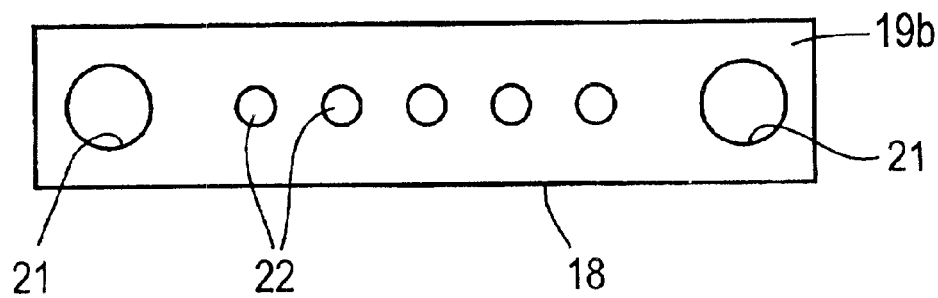
FIG. 2B is a rear view of the optical fiber array to be mounted on the substrate.
Figure 2C:
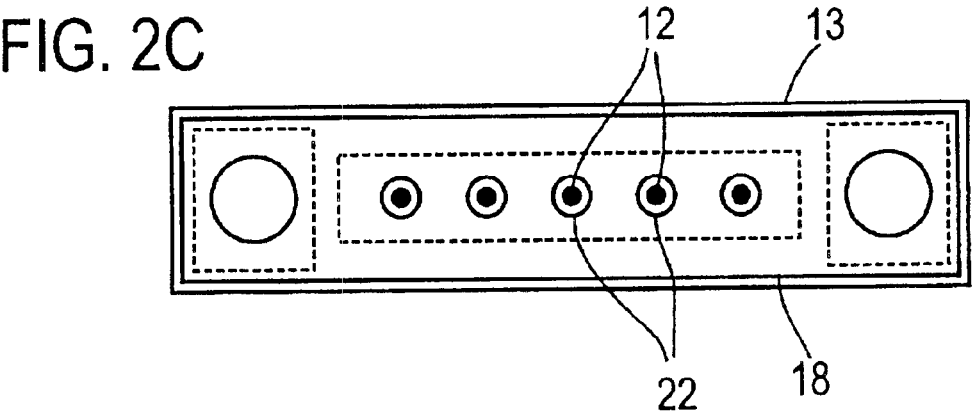
FIG. 2C is a view showing the state that the light receiving elements and the optical fibers have been aligned with one another.

The size of the front surface of the block 19 (lengths of the long side and short side of the rectangular surface) is set, as will be easily understood from FIG. 2C, to a value which is slightly smaller than that of the front surface of the substrate 13 (lengths of the long side and short side of the rectangular surface). In addition, the five optical fibers 22 are aligned (arranged in a line) along the longitudinal direction of the block 19 with the same pitch or spacing therebetween as the light receiving elements 12 of the optical device 11. The opposed end surfaces of each of the optical fibers 22 are flush with the front surface 19a and the rear surface 19b of the block 19, respectively.

The guide holes 21 are formed, as will be easily understood from FIG. 3, in generally parallel with each other, and hence they are also in parallel with the five optical fibers 22. Further, the diameter of each of the guide holes 21 is set to such a size or value that guide pins of an optical connector described later can fit into the corresponding guide holes 21, respectively.

Figure 3A:
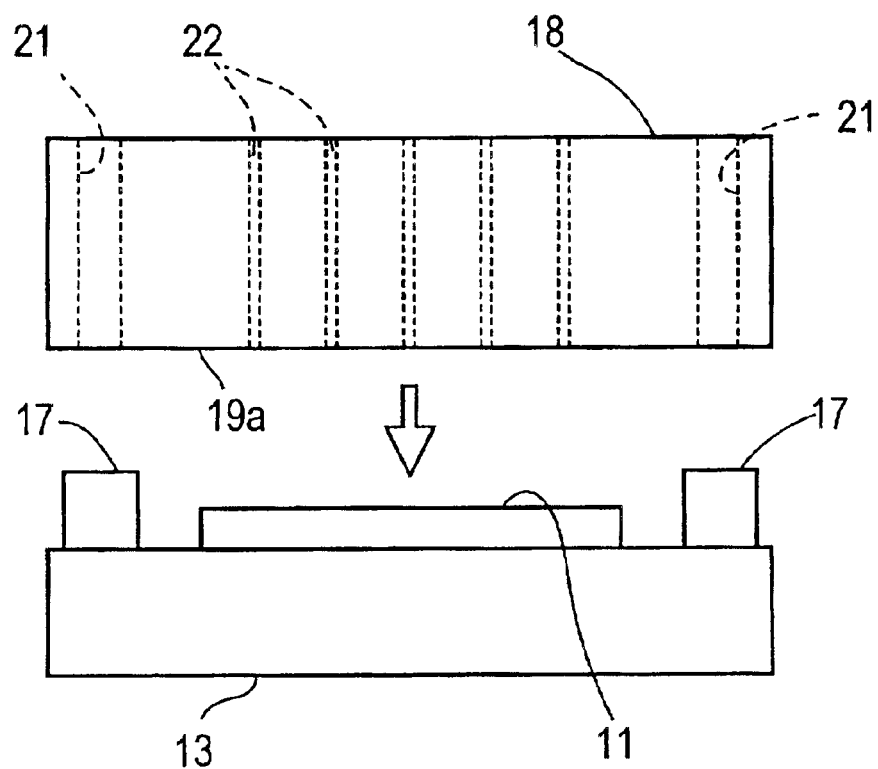
FIG. 3A is a plan view for explaining the manner that the optical fiber array is mounted on the substrate.
Figure 3B:
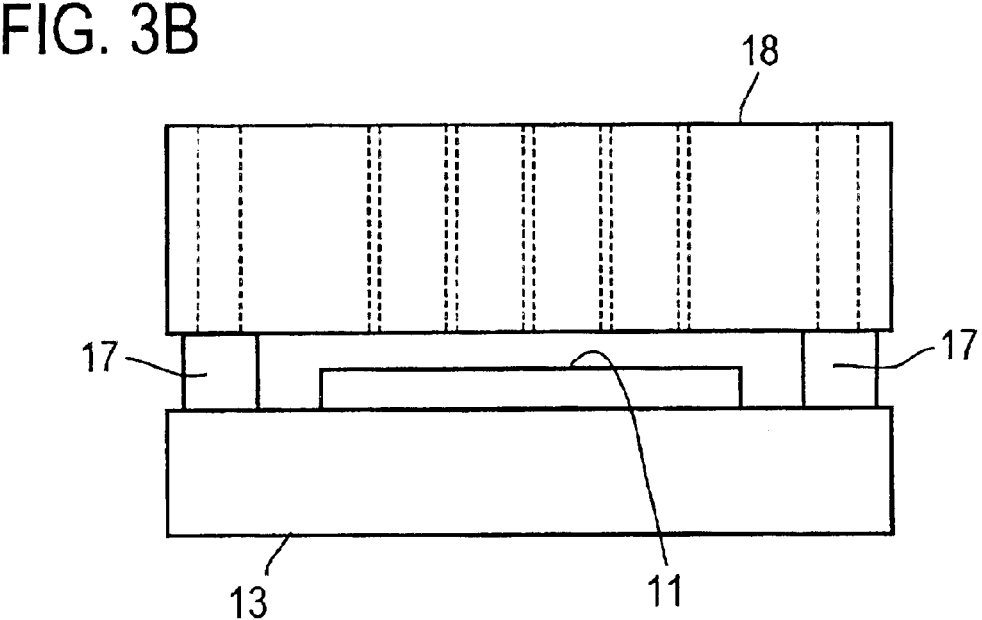
FIG. 3B is a plan view showing the state that the optical fiber array has been mounted on the substrate.

The two generally rectangular parallelepipedic spacers 17 have the same shape and size with each other, and the heights thereof are higher than the height of the optical device 11. Therefore, when the optical fiber array 18 is mounted on the substrate 13, as shown in FIG. 3B, there is a space of a predetermined length between the front surface 19a of the optical fiber array 18 and the front surface of the optical device 11. Further, the spacers 17 are ones for controlling to adjust a space between the front surface 19a of the optical fiber array 18 and the front surface of the optical device 11, in other words, a space between the end surfaces (the end surfaces at the side of the front surface 19a of the block 19) of the optical fibers 22 of the optical fiber array 18 and the light receiving surfaces of the light receiving elements 12 of the optical device 11 opposed to the optical fibers 22, and so it is not required that the spacers 17 are mounted on the substrate 13 at high accuracy.

The optical fiber array 18 is arranged such that the end surfaces of the optical fibers 22 are opposed to the corresponding light receiving surfaces of the light receiving elements 12 by mounting the opposed end portions of the front surface 19a of the optical fiber array 18 on the front surfaces of the pair of spacers 17.

In this embodiment, in case of fixing the optical fiber array 18 to the pair of spacers 17, a work for aligning the light receiving surfaces of the light receiving elements 12 of the optical device 11 with the end surfaces (the end surfaces at the side of the front surface 19a of the block 19) of the optical fibers 22 of the optical fiber array 18, that is, an alignment between them is carried out by use of an image or picture recognition system or apparatus.

FIG. 2 is diagrammatical views for explaining the manner that an alignment between the light receiving surfaces of the light receiving elements 12 and the end surfaces of the optical fibers 22 is carried out by this image recognition system. Information of the image (only the optical device 11 and the spacers 17 are shown) on the front surface of the substrate 13 shown in FIG. 2A and information of the image on the rear surface of the optical fiber array 18 shown in FIG. 2B are taken in the image recognition system which in turn aligns, as shown in FIG. 2C, the centers of the light receiving surfaces of the light receiving elements 12 with the cores at the end surfaces of the optical fibers 22 on the basis of information of positions thereof. While such alignment state is being kept, the optical fiber array 18 is moved toward the substrate 13 as shown in FIG. 3A, and then, the front surface 19a of the optical fiber array 18 is brought into abutment against the pair of the spacers 17 as shown in FIG. 3B. Thereafter, the optical fiber array 18 is fixed to the pair of the spacers 17 using an appropriate fixing means.

As will be easily understood from FIG. 3, the optical fiber array 18 is mounted to the substrate 13 in the state that it is abutting on the front surface of the spacers 17 for space control, and hence the optical fiber array 18 is arranged apart from the front surface (the light receiving surfaces of the light receiving elements 12) of the optical device 11 by a required distance therebetween. Accordingly, the relationship of relative position between the optical device 11 and the optical fiber array 18 can be easily controlled by changing the height of the spacers 17.

In such manner, in case the alignment between the light receiving surfaces of the light receiving elements 12 and the end surfaces of the optical fibers 22 is performed by image recognition thereof thereby to assemble the optical module, notwithstanding that this alignment is passive alignment, such alignment between the light receiving surfaces of the light receiving elements 12 and the end surfaces of the optical fibers 22 can be conducted at high accuracy. In addition, since the pitch in the arrangement of the light receiving elements 12 of the optical device 11 is determined depending upon the accuracy of the photolithography, the light receiving elements 12 can be arranged at high accuracy, and also the optical fibers 22 of the optical fiber array 18 can be arranged with a high precise pitch therebetween. In other words, the accuracies of the optical device 11 and the optical fiber array 18 themselves do not affect the alignment between the light receiving surfaces of the light receiving elements 12 and the end surfaces of the optical fibers 22. Accordingly, it is unnecessary that mounting of the optical device 11 to the substrate 13 is conducted at high accuracy. As a result, the number of working steps required in assembling the optical coupling part of the optical module is remarkably decreased, and it is possible to reduce the cost of the optical module. Particularly, a working step that requires high accuracy is only a step in which the optical fiber array 18 is fixed to the pair of the spacers 17 while the alignment between the light receiving surfaces of the light receiving elements 12 and the end surfaces of the optical fibers 22 is carrying out by the aforesaid image recognition thereof. Consequently, the assembling work of the optical coupling part of the optical module can be remarkably simplified.

Figure 4:
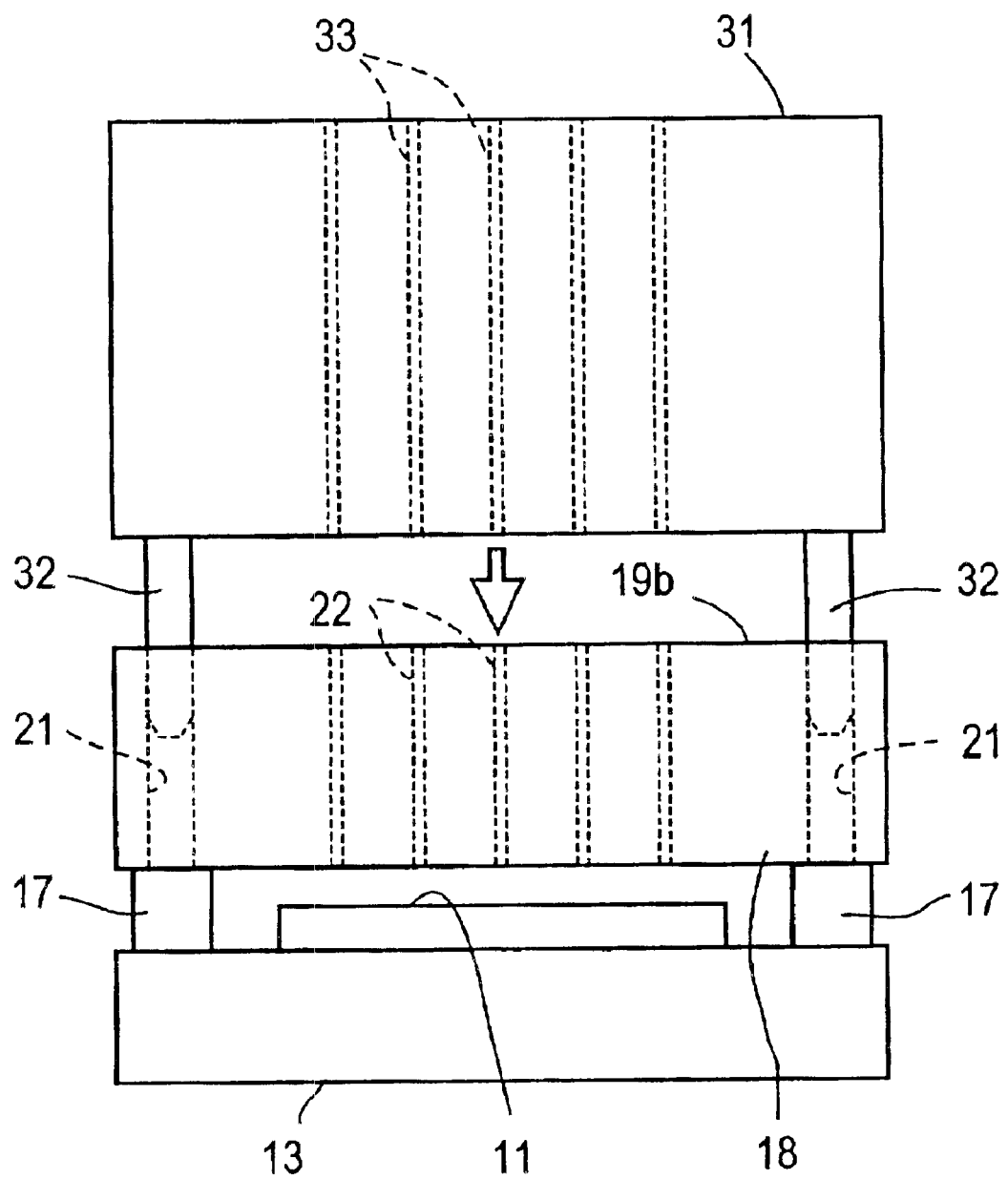
FIG. 4 is a plan view for explaining the manner that an optical connector is mounted to the optical fiber array of the optical module shown in FIG. 3B.

FIG. 4 is a plan view showing the manner that an optical connector 31 is connected to the optical module assembled as described above. This optical connector 31 has substantially the same rectangular shape in section and size as those of the optical fiber array 18, and is provided with generally cylindrical guide pins 32 protruding in front at the opposed end portions of the front surface (the surface at the side opposed to the rear surface of the optical fiber array 11) of the optical connector 31. The outside diameter of each of the guide pins 32 is set to such a size or value that the guide pins 32 fit into the corresponding guide holes 21 of the optical fiber array 18, respectively. It goes without saying that the guide pins 32 are provided on the front surface of the optical connector 31 at the positions thereof corresponding to the guide holes 21 of the optical fiber array 18.

In addition, five optical fibers 33 are buried in the optical connector 31 in a line between the pair of guide pins 32 with the same pitch or spacing therebetween with the optical fibers 22 of the optical fiber array 18 in such manner that they penetrate the connector 31 from the front surface thereof to the rear surface thereof in parallel with one another. These optical fibers 33 are buried at the positions corresponding to the end surfaces of the optical fibers 22 exposed on the rear surface of the optical fiber array 18. Further, the optical fibers 33 of the optical connector 31 are extending toward the outside from the rear surface of the optical connector 31, but the extended portions of the optical fibers 33 are not shown in FIG. 4.

By using the optical connector 31 constructed as described above, when the pair of guide pins 32 thereof are inserted into the guide holes 21 of the optical fiber array 18, the optical fibers 33 of the optical connector 31 abut on the corresponding optical fibers 22 of the optical fiber array 18 so that they are optically connected with each other. Accordingly, it is possible to transmit light signals given through the optical connector from the outside to each of the light receiving elements 12 of the optical device 11 of the optical module.

In the above embodiment, the present invention has been applied to the optical module that is capable of receiving a plurality of optical signals. However, it is needless to say that the present invention is also applied to an optical module that is capable of transmitting a plurality of optical signals, and the same function and effects can be obtained. In case of the optical module capable of transmitting a plurality of optical signals, a surface light emitting type optical device will be mounted on the substrate.

Further, in the above embodiment, the substrate of generally rectangular parallelepipedic shape has been used. It is needless to say that the present invention is also applied to an optical module that comprises: a planar or plate-like substrate; and either one or both of a surface light receiving type optical device and a surface light emitting type optical device mounted on the substrate, and the same function and effects can be obtained.

Moreover, in the embodiment, a pair of guide holes are provided in the optical fiber array, and a pair of guide pins of the optical connector are inserted into the guide holes so that the optical fiber array and the optical connector are coupled with each other. It goes without saying that means for coupling or connecting the optical fiber array and the optical connector with each other is not limited to the guide pins and the guide holes. In addition, the number of the spacer may be one or more than two, and hence the number and shape of the spacer are not limited to those shown in the embodiment.

As is apparent from the foregoing, in accordance with the present invention, alignment between light receiving elements of a surface light receiving type optical element or light emitting elements of a surface light emitting type optical element and the end surfaces of optical fibers of an optical fiber array is carried out by image recognition thereof. Accordingly, it is unnecessary to provide precise markers on a substrate at high accuracy as in the prior art as well as to mount the optical element on the substrate with high precision. As a result, the number of working steps required in assembling the optical module can be remarkably decreased, and the assembling work of the optical coupling part of the optical module can be simplified. Moreover, further advantage is obtained that it is possible to reduce the manufacturing cost of the optical module.

While the present invention has been described with regard to the preferred embodiment shown by way of example, it will be apparent to those skilled in the art that various modifications, alterations, changes, and/or minor improvements of the embodiment described above can be made without departing from the spirit and the scope of the present invention. Accordingly, it should be understood that the present invention is not limited to the illustrated embodiment, and is intended to encompass all such modifications, alterations, changes, and/or minor improvements falling within the scope of the invention defined by the appended claims.

What is claimed is:

1. A method of assembling an optical module comprising the steps of:

mounting a plurality of surface light receiving type or surface light emitting type optical elements on one surface of a substrate with a predetermined pitch;

carrying out a passive alignment between the plurality of optical element and first ends of a plurality of optical fibers exposed at a first surface of an optical fiber array by image recognition thereof, the optical fiber array having the plurality of optical fibers buried there substantially in parallel with one another so that second ends of the plurality of optical fibers are exposed at a second surface of the optical fiber array that is opposite to the first surface and opposed to the plurality of optical emitting elements; and mounting the optical fiber array at the second surface thereof to the substrate with at least one spacer interposed between the substrate and the optical fiber array while alignment between the optical elements and the optical fibers is kept.

2. The method as set forth in claim 1, wherein the passive alignment by image recognition is carried out on the basis of image information on the surface of the substrate on which the optical elements and the spacer have been mounted as well as image information on the first surface of the optical fiber array.

3. The method as set forth in claim 1, wherein the optical array is fixed at the second surface thereof to the spacer mounted on the substrate while the alignment between the optical elements and the first ends of the optical fibers is being kept.

4. The method as set forth in claim 1 further comprising the step of providing engagement means for coupling the optical fiber array with an optical connector to said optical fiber array.

5. A method of assembling an optical module comprising the steps of:

mounting a plurality of surface light receiving type or surface light emitting type optical elements with a predetermined pitch therebetween on one surface of a substrate;

passively aligning centers of the optical elements with centers of respective first ends of a plurality of optical fibers exposed at a first surface of an optical fiber array, wherein the optical fibers are buried in the optical fiber array substantially in parallel with one another with the same predetermined pitch therebetween as that of the optical elements mounted on the substrate such that second ends of the optical fibers are exposed at a second surface of the optical fiber array that is opposite to the first surface, said passive alignment carried out by image recognition of an image of the optical elements mounted on the one surface of the substrate and an image of the first ends of the optical fibers so that the second ends of the optical fibers are respectively opposed to the optical elements; and mounting the optical fiber array to the substrate with at least one spacer interposed between the substrate and the optical fiber array such that a predetermined gap is provided between the respective optical elements and the second ends of the respective optical fibers while the alignment between the optical elements and the optical fibers is being kept.

6. The method as set forth in claim 5, wherein the passive aligning by image recognition is carried out on the basis of image information on the one surface of the substrate on which the optical element and the spacer are mounted as well as image information on the first surface of the optical fiber array.

7. The method as set forth in claim 5, further comprising the step of providing engagement means for coupling the optical fiber array with an optical connector to said optical fiber array.

* * * * *